(12) United States Patent
Brannan et al.

(10) Patent No.: US 11,255,683 B1
(45) Date of Patent: Feb. 22, 2022

(54) FIRST MILE AND LAST MILE RIDE SHARING METHOD AND SYSTEM

(71) Applicant: STATE FARM MUTUAL AUTOMOBILE INSURANCE COMPANY, Bloomington, IL (US)

(72) Inventors: Joseph Robert Brannan, Bloomington, IL (US); Ryan Gross, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 169 days.

(21) Appl. No.: 16/269,263

(22) Filed: Feb. 6, 2019

(51) Int. Cl.
| | | |
|---|---|---|
| *G01C 21/34* | (2006.01) | |
| *G06Q 10/02* | (2012.01) | |
| *G06Q 50/30* | (2012.01) | |
| *G06N 20/00* | (2019.01) | |
| *G06Q 30/02* | (2012.01) | |
| *G07C 5/00* | (2006.01) | |
| *G06Q 10/04* | (2012.01) | |

(52) U.S. Cl.
CPC ......... *G01C 21/3438* (2013.01); *G06N 20/00* (2019.01); *G06Q 10/02* (2013.01); *G06Q 10/047* (2013.01); *G06Q 30/0208* (2013.01); *G06Q 30/0284* (2013.01); *G06Q 50/30* (2013.01); *G07C 5/008* (2013.01)

(58) Field of Classification Search
CPC .............. G01C 21/3438; G01C 21/343; G01C 21/3415; G01C 21/34; G01C 21/3446; G06Q 10/1095; G06Q 50/30; G06Q 10/047; G06Q 10/025; G06Q 30/0208; G06Q 30/0284; G06Q 10/0833; G08G 1/202; G08G 1/096844; G06N 20/00; G07C 5/008

See application file for complete search history.

(56) References Cited

U.S. PATENT DOCUMENTS

| | | | |
|---|---|---|---|
| 10,607,192 B2 * | 3/2020 | Abbas | G08G 1/202 |
| 10,668,930 B1 * | 6/2020 | Harvey | G06Q 30/0645 |
| 10,699,316 B2 * | 6/2020 | Chen | G06Q 30/0625 |
| 10,703,379 B1 * | 7/2020 | Harvey | G06Q 50/30 |
| 10,749,819 B2 * | 8/2020 | Zappacosta | H04L 51/02 |
| 10,788,329 B2 * | 9/2020 | Wu | H04W 4/40 |
| 2018/0260787 A1 * | 9/2018 | Xi | G01C 21/3438 |
| 2019/0272500 A1 * | 9/2019 | Haque | G06Q 10/0833 |
| 2020/0300644 A1 * | 9/2020 | Tian | G01C 21/343 |
| 2021/0295706 A1 * | 9/2021 | Shoval | G08G 1/123 |

\* cited by examiner

*Primary Examiner* — Donald J Wallace
(74) *Attorney, Agent, or Firm* — Marshall, Gerstein & Borun LLP

(57) ABSTRACT

A method of facilitating first mile/last mile transfer of a vehicle includes receiving a first request of a first user including a first route, identifying a second request including a second route having a second current location and a second destination, generating a path, analyzing the first route and the second route using a trained machine learning model, displaying a first message including an incentive, displaying a second message including a cost, receiving an acknowledgement of the first message and an acknowledgement of the second message, and displaying a confirmation to the first user and to the second user.

20 Claims, 8 Drawing Sheets

FIRST MILE AND LAST MILE RIDE SHARING METHOD AND SYSTEM

FIELD OF THE DISCLOSURE

The present disclosure generally relates to a system and method of first mile and last mile ride sharing to augment a car sharing platform and, more particularly, to using trained machine learning models to generate an incentive likely to cause a first user of car sharing platform to act in a ride sharing capacity with respect to a second user.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A car sharing company may operate a car sharing platform (CSP) including a fleet of one or more vehicles generally controlled and/or monitored by the car sharing company. The vehicles' respective titles may be held by the car sharing company, and the vehicles may include any number of trucks, vans and/or other vehicles (e.g., motorcycles, buses, etc.). The vehicles may include autonomous and/or semi-autonomous features. Increasingly, telematics data related to the operation of motor vehicles of all types is captured by telematics systems that are built into vehicles, or which are carried into vehicles by drivers and passengers (e.g., mobile computing devices). Such telematics systems measure and capture data directly from vehicle computer systems as well as indirectly from the vehicle environment. In general, a car sharing company's owner does not drive the fleet of vehicles operated by the car sharing company. Rather, a customer of the car sharing company (i.e., a vehicle operator) reserves a vehicle via the CSP to drive to a destination, and then leaves (i.e., abandons) the vehicle.

In contrast to car sharing, a ride sharing service may include a ride sharing operator operating a vehicle owned/leased by the ride sharing operator to provide transportation to passengers who are customers of a ride sharing company. The ride sharing company may facilitate interaction between the ride sharing operator and the passenger by providing both with a computer application that matches ride share operators to passengers. Uber and Lyft are examples of popular ride sharing services.

A first problem with conventional CSPs is the first-mile/last-mile problem. To access the vehicles of a CSP, a user may need to travel to a central vehicle location. Further, when returning a vehicle, a user may need to park the vehicle at a central vehicle location. Thus, the user must find alternate (i.e., non-CSP) transportation to and from the CSP (i.e., over the last and first mile of the user's trip). However, in practice, sometimes the trip from the user's origin to the central vehicle location, and/or from the central vehicle location to the user's final destination may be longer (e.g., tens of miles or more) than one mile. User adoption of CSPs is therefore limited.

BRIEF SUMMARY

In one aspect, a computer-implemented method of facilitating a first mile/last mile transfer of a vehicle includes receiving a first car sharing request of a first user including a first route having a first current location and a first destination, identifying a second car sharing request of a second user including a second route having a second current location and a second destination, generating a path, wherein the path includes the first current location, the second current location, the first destination, and the second destination, analyzing the first route and the second route using a trained machine learning model to determine a incentive to the first user and a cost to the second user, displaying a first message to the first user, the first message including the incentive, displaying a second message to the second user, the second message including the cost, receiving an acknowledgement of the first message from the first user and an acknowledgement of the second message from the second user; and displaying a confirmation to the first user and to the second user.

In another aspect, a non-transitory computer readable medium contains program instructions that when executed, cause a computer system to receive, in a remote computing system, a first car sharing request of a first user including a first route having a first current location and a first destination, identify, in a remote computing system, a second car sharing request of a second user including a second route having a second current location and a second destination, generate, via the one or more processors, a path including the first current location, the second current location, the first destination, and the second destination, analyze the first route and the second route using a trained machine learning model to determine an incentive to the first user and a cost to the second user, display a first message to the first user including the incentive, display a second message to the second user including the cost, receive an acknowledgement of the first message from the first user and an acknowledgement of the second message from the second user; and display a confirmation to the first user and to the second user.

In yet another aspect, a computing system includes one or more processors; and one or more memories storing instructions that, when executed by the one or more processors, cause the computing system to receive, in a remote computing system, a first car sharing request of a first user including a first route having a first current location and a first destination, identify, in a remote computing system, a second car sharing request of a second user including a second route having a second current location and a second destination, generate, via the one or more processors, a path including the first current location, the second current location, the first destination, and the second destination, analyze the first route and the second route using a trained machine learning model to determine an incentive to the first user and a cost to the second user, display a first message to the first user including the incentive, display a second message to the second user including the cost, receive an acknowledgement of the first message from the first user and an acknowledgement of the second message from the second user; and display a confirmation to the first user and to the second user.

DETAILED DESCRIPTION

Overview

Figure 1:
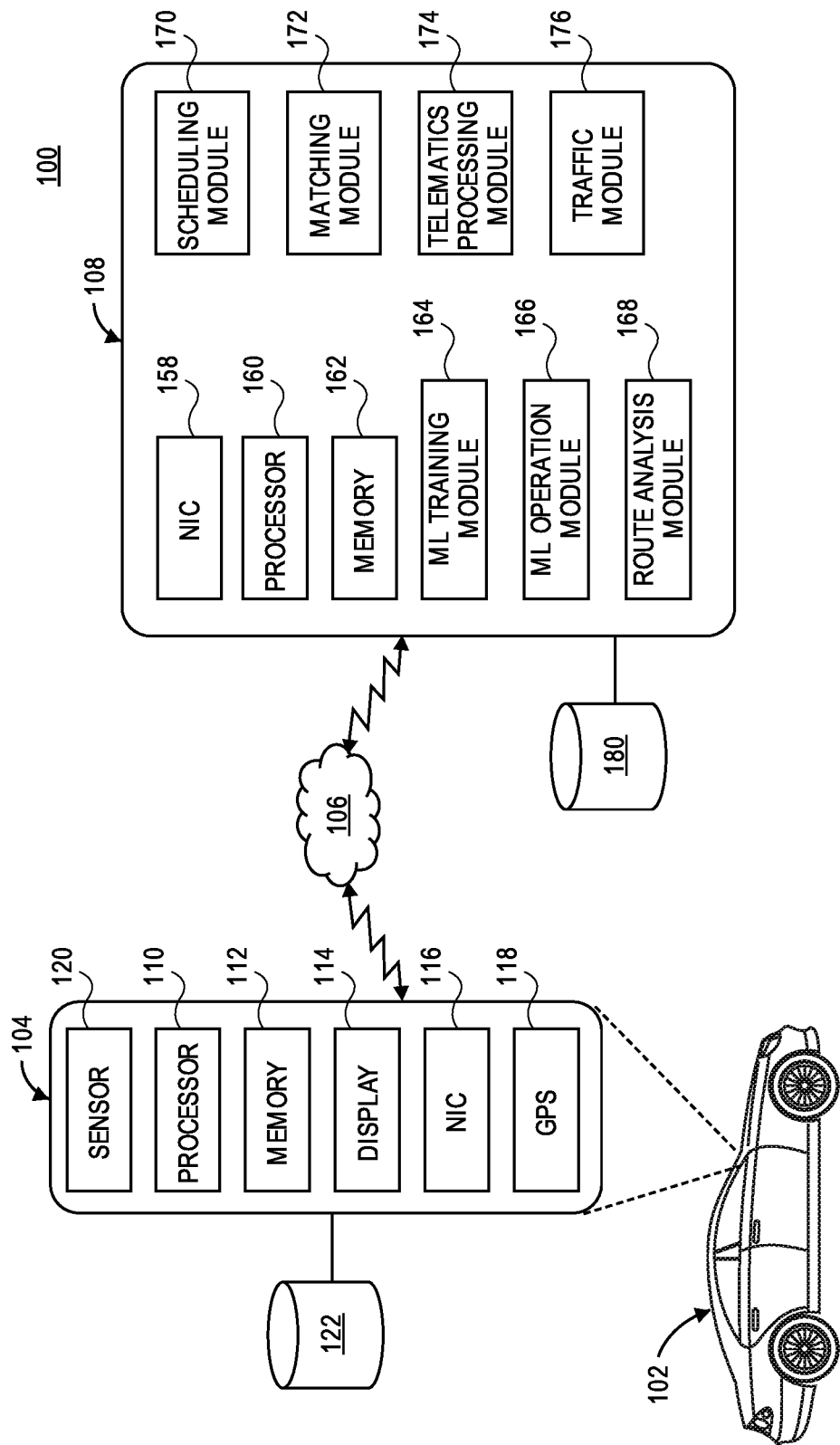
FIG. 1 depicts an example computing environment for implementing a route matching system and method of first mile/last mile ride sharing to facilitate the transfer of a vehicle within a car sharing platform, according to an embodiment.

The present techniques include methods and systems for facilitating vehicle transfer in a car sharing platform, and more particularly, for training and operating one or more machine learning (ML) models to incentivize passengers and vehicle operators to perform an action relating to the vehicle on behalf of the CSP. A first CSP user and a second CSP user may submit a respective request for a car sharing vehicle to a remote computing device, wherein the respective request may include a respective route. Each respective route may include a current location and a destination location. The remote computing device may compare the two routes and combine the two routes by analyzing the respective routes using one or more graph theoretic algorithm, (e.g., Dijkstra's algorithm, Prim's algorithm, etc.). For example, the remote computing device may join a first route to one of a plurality of second routes by choosing the second route that causes the least amount of delay in terms of time (e.g., minutes), or the shortest detour in terms of distance (e.g., miles), to the first route.

The CSP may receive vehicle telematics data from a telematics system integral to the vehicle and/or data generated by a mobile device of the user. In general, the "user" may be driver/operator or passenger of a vehicle of a CSP. The telematics data may include a data set reflecting a plurality of features, readings, and/or statuses of the vehicle. For example, the telematics data may include driving events (e.g., engagement of a cruise control system, gas tank refueling, a braking event, location, etc.) that are directly measureable by analyzing telematics data. Telematics data may also include information regarding the environment of the vehicle, such as humidity, temperature, etc. Telematics data may include the mileage of the vehicle, the levels of any fluids in the vehicle (e.g., windshield wiper fluid, oil fluid, brake fluid, etc.), tire pressure, etc. that is ascertainable by a telematics system of the vehicle using the onboard sensors and computers of the vehicle. User data may include information provided by the user to a computer, such as by way of an electronic form, web site, mobile application or other computerized mechanism for entering information. For example, user data may include photographs, textual descriptions, selections of a user from a pre-programmed menu (e.g., a value of a slider widget, a Boolean entry, etc.).

The present techniques may include processing the telematics data and/or the user data using one or more trained machine learning (ML) module to identify an incentive relating to the user. For example, a first ML model may be accessed to generate an incentive for a car sharing user operating a vehicle to pick up a second user (e.g., a ride sharing user). A second ML model may be accessed to generate a cost to the second user for the pick up. The CSP may provide the incentive to the first user and may collect the cost from the second user. The CSP may decide to match and/or confirm the first user with the second user only in such cases that the cost exceeds the incentive by a predefined number (e.g., $10 in US currency).

Example Computing Environment

FIG. 1 depicts an example route matching environment 100 for implementing, inter alia, the matching of a first user of a CSP to a second user of a CSP, to cause the first user of the CSP to act in a ride sharing capacity with respect to the second user of the CSP to solve the first mile/last mile problem of the second user of the CSP. The environment 100 may include a vehicle 102 associated with a telematics system 104, a network 106, and a server 108.

The vehicle 102 and the telematics system 104 are remote from the server 108 and are coupled to the server 108 via the network 106. The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network 106 may support a cellular (e.g., 4G, 5G, etc.) connection to a mobile computing device of a user and an IEEE 802.11 connection to the mobile computing device. While referred to herein as a "server," the server 108 may, in some implementations, include multiple servers and/or other computing devices. Moreover, the server 108 may include multiple servers and/or other computing devices distributed over a large geographic area (e.g., including devices at one or more data centers), and any of the operations, computations, etc., described below may be performed in by remote computing devices in a distributed manner.

The telematics system 104 may include hardware and software components implemented in one or more devices permanently and/or temporarily affixed to, or otherwise carried on or within, the vehicle 102. For example, some or all of the components of the telematics system 104 may be built into the dash of the vehicle 102 or affixed elsewhere within the vehicle 102 (e.g., via an onboard diagnostics port of the vehicle 102). In an embodiment, a portion of the telematics system 104 may be implemented using a mobile computing device (e.g., a smart phone of the user). In some embodiments, multiple instances of the telematics system 104 may include a first telematics system 104 of a first user implemented as a smart phone and a second telematics system 104 of a second user implemented as a smart phone.

The telematics system 104 may include specialized hardware (e.g., one or more sensors) and computer-executable instructions for retrieving/receiving vehicle telematics data from the vehicle 102. In some cases, the telematics system 104 may be implemented using components of the vehicle 102 and a mobile computing device. For example, a vehicle telematics generation module may be included in the vehicle 102 and a vehicle telematics collection module may be included in a mobile computing device of the user, wherein the vehicle telematics collection module receives and/or retrieves a telematics data set from the vehicle telematics generation module. In some embodiments, some or all of the telematics system 104 may be provided by a CSP. For example, the telematics system 104 owned by the CSP may be provided to a different owner of the vehicle 102. In some embodiments, the CSP may own the vehicle 102, the telematics system 104, and the server 108.

In an embodiment, a first telematics system in the vehicle 102 may collect data and transmit the data to the server 108, while a second telematics system in the mobile computing device of the user may display information related to connecting a first user and a second user in a car sharing capacity. For example, the first user may be customer operating a vehicle of a CSP, and the second user may be stationary in a home or building. Both the first and second user may have a smart phone, corresponding to a first and second telematics system 104, respectively. While FIG. 1 depicts only a single vehicle 102, the vehicle 102 may be in communication with numerous other servers similar to the server 108 via the network 106 and/or other networks. The telematics system 104 may include a processor 110, a memory 112, a display 114, a network interface 116, and a global positioning system (GPS) unit 118. The processor 110 may be a single processor (e.g., a central processing unit (CPU)), or may include a set of processors (e.g., a CPU and a graphics processing unit (GPU)). The telematics system 104 may further include one or more sensor 120 and an electronic database 122.

The memory 112 may be a computer-readable, non-transitory storage unit or device, or collection of units/devices, that includes persistent (e.g., hard disk) and/or non-persistent memory components. The memory 112 may store instructions that are executable on the processor 110 to perform various operations, including the instructions of various software applications and data generated and/or used by such applications. In the example implementation of FIG. 1, the memory 112 may store instructions that when executed by the processor 110 facilitate the bidirectional transmission of telematics data between the telematics system 104 and the server 108 (e.g., sending telematics data collected from the vehicle 102 to the server 108, receiving requests and responses relating to telematics data from the server 108, receiving/retrieving telematics and/or user data to generate and display ride share offer messages to the user to facilitate the user's performance of actions relating to the vehicle, etc.).

The display 114 includes hardware, firmware and/or software configured to enable a user to interact with (i.e., both provide inputs to and perceive outputs of) the telematics system 104. For example, the display 114 may include a touchscreen with both display and manual input capabilities. Alternatively, or in addition, the display 114 may include a keyboard for accepting user inputs, and/or a microphone (with associated processing components) that provides voice control/input capabilities to the user. In some embodiments, the telematics system 104 may include multiple different implementations of the display 114 (e.g., a first display 114 associated with the vehicle 102 and a second display 114 associated with a mobile computing device of the user).

The network interface 116 includes hardware, firmware and/or software configured to enable the telematics system 104 to wirelessly exchange electronic data with the server 108 via the network 106. For example, network interface 116 may include a cellular communication transceiver, a WiFi transceiver, and/or transceivers for one or more other wireless communication technologies (e.g., 4G).

The GPS unit 118 includes hardware, firmware and/or software configured to enable the telematics system 104 to self-locate using GPS technology (alone, or in combination with the services of server 108 and/or another server not shown in FIG. 1). Alternatively, or in addition, the telematics system 104 may include a unit configured to self-locate, or configured to cooperate with a remote server or other device(s) to self-locate, using other, non-GPS technologies (e.g., IP-based geo-location).

In some embodiments, software stored in the memory 112 provides functionality for collecting telematics data from the vehicle 102. If the telematics system 104 is a unit integrated in the vehicle (e.g., a head unit providing vehicle dashboard integrated navigation technology), for example, the telematics system 104 may include a hardwired connection (e.g., via a Controller Area Network (CAN) bus) to one or more other units of the vehicle 102. As another example, if the telematics system 104 is a smartphone (or smart watch, etc.), the telematics system 104 may couple to one or more units of the vehicle via a wired connection (e.g., an onboard diagnostics connection) or a wireless connection (e.g., Bluetooth, WiFi, etc.). Software stored in the memory 112 may provide functionality for processing telematics data from the vehicle 102. The processing may include retrieving/receiving data from one or more sensors 120 communicatively coupled to the telematics system 104 (e.g., vehicle-based sensors).

The sensor 120 may include one or more sensors associated with the vehicle 102 (e.g., a speedometer sensor) and/or a mobile device of the user (e.g., an accelerometer in a smartphone). The sensor may provide data (e.g., sensor readings) to applications (e.g., the collection module 120). Many types of sensors may be used, such as cameras, video cameras, and/or microphones. In some embodiments, sensors may read the speedometer, engine warning lights (if any), oil pressure, wiper fluid level, oil temperature, emission readings, etc. Of course, some of the telematics data created by sensors may not be visible to/accessible by the vehicle operator. In embodiments wherein the telematics system 104 is implemented using a mobile computing device, the sensor 120 may be a vehicle-based sensor accessed wirelessly by the telematics system 104.

The database 122 may be any suitable database (e.g., a structured query language (SQL) database, a flat file database, a key/value data store, etc.). The database 122 may include a plurality of database tables for storing data according to data storage schema. The database 122 may include relational linkages between tables, and may allow complex data types such as time series data to be stored and queried.

The server 108 includes a network interface 158, a processor 160, a memory 162, an ML training module 164, an ML operation module 166, a route analysis module 168, a scheduling module 170, a matching module 172, a telematics processing module 174, a traffic module 176, and a database 180. The network interface 158 includes hardware, firmware and/or software configured to enable the server 108 to exchange electronic data with the telematics system 104 via network 106. For example, network interface 158 may include a wired or wireless router and a modem. The processor 160 may be a single processor (e.g., a central processing unit (CPU)), or may include a set of processors (e.g., a CPU and a graphics processing unit (GPU)).

The memory 162 is a computer-readable, non-transitory storage unit or device, or collection of such units/devices, that may include persistent (e.g., hard disk) and/or non-persistent memory components. The memory 162 may store data generated and/or used by the ML training module 164, the ML operation module 166, the route analysis module 168, the scheduling module 170, the matching module 172, the telematics processing module 172, and/or the traffic module 176, for example.

The ML training module 164 is generally configured to load, create, train, and/or store ML models for use by the server 108. For example, the ML training module 164 may include instructions for training a first ML model by analyzing historical data to identify incentives and costs. Multiple different models may be developed, such as a model for generating incentives and costs in a first mile/last mile context, or in contexts where the destination is the same or different for a first user and second user. For example, a first ML model may be trained using a historical data set of ride sharing data, wherein the ride sharing data indicates a price that was paid, a distance traveled, a time of day, a time to arrival, a traffic congestion factor, profile information about the vehicle operator, etc. A second ML model may be trained using a detour in time, a delay in miles, a time of day, a traffic congestion factor, profile information about the ride share passenger, etc.

A training data set may include historical data. For example, the historical data may include user characteristics (e.g., age, location, gender, driver's license state, etc.) vehicle information (e.g. make, model, general category, etc.), one or more geographic markers (e.g., a GPS coordinate, a route represented as a beginning and ending point, etc.), a trip distance, discounted rental in hours, discounted rental in percentage off, and/or action description. Each historical datum may include an indication of whether or not a user accepted a discount/bonus (i.e., a label). The ML training module 164 may include instructions for training a model using the historical data, such that given a first user's profile information (e.g., age, gender, number of previous successful offer acceptances, etc.), trip data (e.g., trip origin point and trip termination point), and a second user's information (e.g., age, gender, etc.) the model may predict a minimum offer value in terms of discounted rental denominated in hours or percentage off that the first user would be willing to accept to perform a particular action (e.g., act in a ride sharing capacity with respect to the second user). The ML operation module 166 may be used to load and operate models trained by the ML training module 164.

The ML training module 164 may train one or more ML models to approximate functions. The ML models may be trained to accept a plurality of inputs, which may include inputs in the telematics data 104 and from other sources (e.g., user data). For example, in some embodiments, the ML training module 164 may be trained using historical data (e.g., telematics data, user data, etc.) retrieved/received from the database 180). In general, the ML training module 164 may train models by, inter alia, establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, a Bayesian model may be used to train the ML model.

In an embodiment, the trained ML model may include an artificial neural network (ANN) having an input layer, one or more hidden layers, and an output layer. Each of the layers in the ANN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of ANNs are possible.

In an embodiment, the input layer may correspond to input parameters that are numerical facts, such as the number of previous ride sharing offer acceptances of a user, a number indicating a trip distance in miles, etc. The input layer may correspond to a large number of input parameters (e.g., one million inputs), in some embodiments, and may be analyzed serially or in parallel. Further, various neurons and/or neuron connections within the ANN may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction or an expected value. In some embodiments and/or scenarios, the output layer includes only a single output. For example, a neuron may correspond to one of the neurons in the hidden layers. Each of the inputs to the neuron may be weighted according to a set of weights $W_1$ through $W_i$, determined during the training process (for example, if the neural network is a recurrent neural network) and then applied to a node that performs an operation a. The operation a may include computing a sum, a difference, a multiple, or a different operation. In some embodiments weights are not determined for some inputs. In some embodiments, neurons of weight below a threshold value may be discarded/ignored. The sum of the weighted inputs, $r_1$, may be input to a function which may represent any suitable functional operation on $r_1$. The output of the function may be provided to a number of neurons of a subsequent layer or as an output of the ANN.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. For instance, machine learning may involve identifying and recognizing patterns in existing text or voice/speech data in order to facilitate making predictions for subsequent data. Voice recognition and/or word recognition techniques may also be used. Models may be created based upon example inputs in order to make valid and reliable predictions for novel inputs. Additionally or alternatively, the machine learning programs may be trained by inputting sample data sets or certain data into the programs, such as drone, autonomous or semi-autonomous drone, image, mobile device, vehicle telematics, smart or autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

The ML training module 164 may load a model trained by the ML training module 164 from the database 180. For example, the ML training module 164 may load a trained ML model and pass a series of parameters to the trained ML module to identify a minimum offer value likely to motivate a customer to accept an action, or to identify those customers likely to accept a particular action value with respect to a particular vehicle. For example, the trained ML model may output a dollar value. The dollar value may indicate a minimum price that a car sharing customer is willing to accept to provide a ride sharing service to a user. In some embodiments, the CSP may compare the dollar value to a profit value representing a profit to the CSP of the car sharing transaction. The CSP may decide to avoid offering a ride share offer unless the dollar value exceeds the profit by a given amount (e.g., $10). In some embodiments, the ML operation module 166 may be called by another module, such as the scheduling module 170. The ML operation module 166 may process inputs produced by other modules, such as the route analysis module 168.

The route analysis module 168 is generally configured to generate routes by analyzing geographic origin information and geographic destination information. For example, the route analysis module 168 may generate a route comprising a list of waypoints (e.g., GPS coordinates) of a map. The route may include other information, such as a current location of a user, the percentage of a route that the user has traversed, etc. Each waypoint may include a traversed flag, for example, indicating whether the user has passed that point.

The scheduling module 170 may include software instructions that when executed by the processor 160 cause a comparison of two routes generated by the route analysis module 168 to be compared. The comparison may include determining whether an origin of a second route is within a first route. The comparison may include determining a percentage of route similarity, in terms of how geographically close a second route is to a first route. Route similarity may be expressed as a percentage. The scheduling module may communicate with other modules (e.g., the traffic module 176) to obtain information used to qualify the similarity of two or more routes. The scheduling module 170 may seek to simplify and/or combine routes. For example, given a first route and second route, the scheduling module 170 may determine whether the origin of the second route can be added to the first route without adding unreasonable delay to the first route. In some embodiments, the scheduling module 170 may correlate traffic information to route information and adjust timeliness estimates based on real-time traffic information. The scheduling module 170 may correlate user information and vehicle information to routes, to determine seating requirements. For example, given a first route and a second route, the scheduling module 170 may determine that a first user and a first vehicle correspond to the first route. The scheduling module 170 may determine that the first vehicle seats five adults, and that the first user is an adult. The scheduling module 170 may then determine that a second route corresponds to a second adult user including an additional adult passenger. The scheduling module 170 may therefore determine that the second route can be integrated into the first route, in terms of time requirements, seating requirements, etc. User data may be received in the server 108 from the telematics system 104 in the form of CSP first mile/last mile ride sharing requests, as discussed further below. The scheduling module 170 may receive telematics data (e.g., real-time location information of vehicles) from the telematics system 104 via the network 106. The scheduling module 170 may generate a list of one or more possibilities for combining routes.

The matching module 172 may receive/retrieve a list of candidate matches generated by the scheduling module 170 that are combinable in terms of the various criteria discussed above. The matching module 172 may parameterize an ML input data structure, including one or more user, vehicle, and/or route. The matching module 172 may pass the parameterized data structure to the ML training module 164, and receive an output indicating a minimum offer value that a user associated with a first route may be willing to accept in order to act in a ride sharing capacity with respect to one or more users associated with the second route. The matching module 172 may analyze the combinable routes, including associated user/vehicle information, and generate a list of ride share offers for transmission to a mobile computing device of the first user, and/or a list of potential car share offers for transmission to a mobile computing device of the second user. The matching module 172 may receive an indication of the first user that the first user accepts a ride share offer, and/or an indication of the second user that the second user accepts a car share/ride share offer. The matching module 172 may notify the first user and the second user of a route match, and may add a record to an electronic database (e.g., the database 180) denoting the match.

The telematics processing module 174 may include a set of computer-executable instructions for receiving, retrieving, processing, and/or analyzing vehicle telematics data. For example, the instructions may include routines for processing telematics data encoded in proprietary data formats and/or standardized data formats (e.g., the Association of Equipment Management Professionals standard). The telematics processing module 174 may store data converted from telematics data into a standardized data format in the database 180, allowing data in disparate formats to be uniformly queried by other components. Therefore, whereas two vehicle manufacturers may encode a telematics fact using a different data formatting strategy (e.g., vehicle speed may be encoded in miles-per-hour by a first manufacturer and kilometers-per-hour by a second manufacturer), the scheduling module 170 (or another module) may directly compare vehicle speeds of two vehicles of the respective manufacturers.

The traffic module 176 may include an application programming interface (API) or other computerized facility for retrieving real-time traffic data, predicted traffic data, and/or historical traffic data. For example, the traffic module 176 may accept a parameter corresponding to a geographic location (e.g., a place name, GPS coordinate, etc.) and may return traffic conditions corresponding to that geographic location. The traffic information may be encoded in a proprietary or standard mapping format (e.g., in an OpenStreetMap format). A module of the server 108 may overlay the traffic information received/retrieved from the traffic module 176 in a map displayed to a user (e.g., via the display 114).

The database 180 may be any suitable database (e.g., a structured query language (SQL) database, a flat file database, a key/value data store, etc.). The database 180 may include a plurality of database tables for storing data according to data storage schema. The database 180 may include relational linkages between tables, and may allow complex data types such as time series data to be stored and queried. For example, the database 180 may be used to store training data used by the ML training module 164, trained models generated by the ML training module 164, route information generated by the route analysis module 168, combinable routes generated by the scheduling module 170, and ranked combinable routes generated by the matching module 172. The database 180 may therefore include a reflection of the routes that are currently combined, and a historical reflection of combined routes.

The database 180 may be configured to store a practically unlimited amount of historical information related to each vehicle, so that the database 180 may be queried to determine the status of each CSP vehicle and/or route at any point in time. Although this disclosure describes a CSP having a fleet of vehicles, in some embodiments, one or more sublists of vehicles may be created in the database which may allow the environment 100 to more effectively organize one or more CSP vehicle fleets. Any of the modules of the server 108 may access the database 180 to create, read, update, and delete information.

The computer-implemented methods discussed herein may include additional, fewer, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

In operation, the computing environment 100 may receive data from the vehicle 102, the telematics system 104, and process that data using the server 108 to allow the CSP to, inter alia, determine incentives and/or costs for respective customers of the CSP. For example, the server 108 may receive requests from one or more users, each of whom is associated with a respective telematics system 104. For example, a first user may be a CSP customer operating a vehicle with a built-in telematics system 104 and a second user may be a CSP customer sitting at home using a mobile computing device implementing another embodiment of the telematics system 104. At around the same time (e.g., within a 10-minute time span) the first user may submit a request for ride sharing offers and the second user may submit a request for car sharing offers. That is, the first user may advertise, such as by activating a user interface button via the display 114, that the first user is open to picking up other users. The advertisement may be submitted to the server 108. In some embodiments, the telematics system 104 of the first user may advertise such availability of the first user by default, without the first user having to take an action (e.g., without the first user needing to activate a user interface button). The second user may similarly advertise that the second user is open to receiving ride offers (e.g., an offer from the first user to be picked up in the vehicle 102) from car sharing users.

Once the server 108 receives the request from the first user, the server 108 may identify one or more second car sharing request that matches the request of the first user. The server 108 may maintain a list of car sharing and/or ride sharing requests in the database 180. A car sharing request may be a request to take a vehicle (e.g., the vehicle 102) for a period of time (e.g., several hours). A ride sharing request may be a request to be picked up by a customer of the CSP acting in a car sharing capacity (i.e., a user who is currently operating the car s a car sharing customer). A request may include a combination of ride sharing and car sharing (e.g., a second user who agrees to be picked up by a first user and accompany the first user until the first user reaches the first user's destination).

The server 108 includes a scheduling module 170 and a matching module 172 for facilitating the combining of users and routes, based on time, distance, and route compatibility. As discussed below, the scheduling module 170 may determine whether a first user's route is likely to intersect with a second user's route in a timely way, such that the second user will not experience a pronounced delay in waiting for the first user to arrive. The matching module 172 may include the ability to match users based on other criteria, such as whether one or both of the first user and second user have passed a required background check. Because the techniques disclosed herein may include the introduction of strangers, the guarantee of a mutual background check of both participants in advance may be highly desirable. The telematics processing module 174 may receive realtime information relating to the vehicle 102 operated by the first user and the second user (e.g., location) and may therefore be used by the scheduling module 170 to more reliably determine estimated times of arrival for the second user to the location of the first user. The scheduling module 170 may receive/retrieve information regarding traffic in realtime from the traffic module 176, thereby enhancing the accuracy of time-based predictions.

The memory 162 of the server 108 may include instructions for training and operating ML modules that determine the economic viability of the environment 100 to the CSP. The CSP seeks to turn a profit by operating a fleet of vehicles to provide car sharing services to customers. The CSP stands to lose money if the CSP offers a first CSP customer too much money to provide a first mile pickup or last mile drop-off service to a second CSP customer. The CSP stands to incur increased wear and tear on vehicle components, increased mileage, and displaced vehicles if incentives and costs are not optimized.

As noted, the ML training module 164 may train multiple models using historical labeled data indicating whether or not an offer was accepted, and at what price. The ML model may be trained to maximize acceptable cost and to minimize acceptable incentives, according to the training principles described herein. Once the ML model is trained, the ML operation module 166 may call a respective ML model using parameters included in the car sharing request (e.g., the location of the vehicle, the predicted delay, the estimated time of arrival, etc.) and other parameters (e.g., the time of day) to produce a predicted cost and/or incentive. The server 108 may generate messages for the user interface framework, as described below, and transmit those messages to the respective telematics system 104 of the first user and the second user. When the first user and the second user acknowledge the respective messages including the car sharing incentive and the ride sharing cost, the server 108 may record such acknowledgement and join the first and second user together into a combined route, and store an electronic record reflecting the combined route in the database 180. The following sections describe example computing environments for implementing the various embodiments supported by the environment 100.

Figure 2:
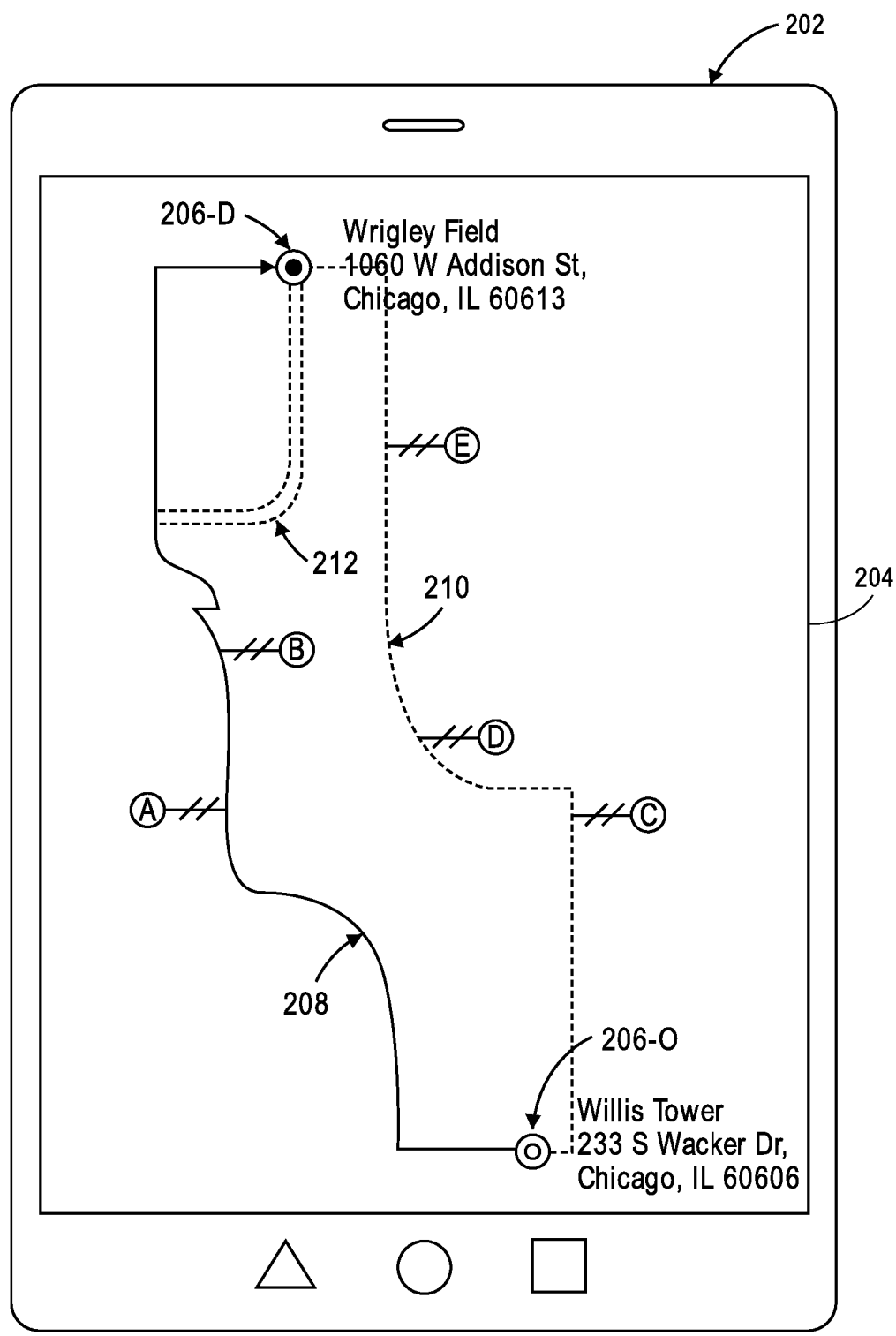
FIG. 2 depicts an example interactive user interface for implementing first mile/last mile ride sharing, according to an embodiment.

Example Graphical Interactive User Interface for Displaying Car Sharing Offers to a User of a Car Sharing Platform FIG. 2 depicts a computing environment 200 for implementing a system and method of first mile/last mile ride sharing to augment a CSP, according to an embodiment. Computing environment 200 includes a device 202 that includes a display screen 204. The device 202 may correspond to a mobile computing device of a first user, such as a smart phone, tablet, etc. In some embodiments, the device 202 may be a laptop or other suitable connected computing device. In still further embodiments, the device 202 may be a device of the CSP that is integral to the vehicle 102, such as a display built into the dash of the vehicle 102. In embodiments, the device 202 may correspond to the telematics system 104, in whole or in part. For example, the device 202 may implement a portion of features of the telematics system 104 (e.g., the display 114 may correspond to the display screen 204) while other portions of the telematics system 104 are implemented by a second device that is integral to the vehicle 102. The device 202 may include a memory corresponding to the memory 112 including instructions (e.g., an application) which when executed, causes the screen 204 to display information and to receive inputs of the first user.

The screen 204 may display a map view. The map view may be generated by the route analysis module 168 of FIG. 1, and may include an origin location 206-O and a destination location 206-D. The origin 206-O may be a geographic point representing an origin, or start point, of the first user. The destination 206-D may be a destination of the first user. In the depicted example, the first user may be traveling from the origin 206-O to the destination 206-D using a vehicle (e.g., the vehicle 102) obtained from the CSP. Therefore, the first user may be considered a car sharing user for purposes of the example, in that the first user intends to operate the vehicle to drive from origin 206-O to destination 206-D. The screen 204 may be displayed to the first user before or after the first user picks up the vehicle to take the trip, and may include multiple routes.

The screen 204 may include a first route 208 and a second route 210. The first route may include a first set of ride share offers, namely an offer A and an offer B, representing ride share offers. In some embodiments, additional information may be displayed in conjunction with the offer A and the offer B, such as: respective rider rating, respective discount, respective detour in terms of distance, respective detour in terms of time, etc. By interacting with the offer A and the offer B, such as by touching the display of the device 202, the first user may cause the screen 204 to display additional information about the respective ride share offers. The route 208 may include a sub-route 212. The sub-route 212 is an alternate path to the destination 206-D, and the sub-route may include additional ride share offers that may be displayed when the first user touches the sub-route 212.

The second route 210 may be an alternate route to the destination 206-D. The second route 210 may include a second set of ride share offers, namely an offer C, an offer D, and an offer E. Before departing on the trip from 206-O to 206-D, the first user may select from either of the route 208 and the route 210, and once having selected a route, the first user may select one or more offers along that route. For example, the first user may select the route 210, and may select the ride share offer C and ride share offer E. In that case, the first user may receive navigational instructions from the map view from the origin 206-O, to the location of the ride share offer C, to the location of the ride share offer E, to the destination 206-D. At all times, the first user is a car sharing user for purposes of distinguishing the user from the respective users associated with the ride share offer C and the ride share offer E, who are picked up and transported to the destination 206-D by the first user.

Once the vehicle arrives at the destination 206-D, one of the passengers/a second user (e.g., the user associated with the ride share offer C) may assume the role of the first user. In this case, the car sharing trip of the first user comes to an end, the ride sharing trip of the second user comes to an end, and the car sharing trip of the second user begins. Another passenger (e.g., the user associated with the ride sharing offer C) may never be associated with a car sharing trip, in this case. The device 202 may include instructions for communicating the location of the vehicle to the server 108, and for updating a respective smart phone device of the first user and the second user to indicate their current role. For example, the scheduling module 170 may transmit an indication to the first user when the first user departs the origin 206-O stating, "Your car sharing trip is underway." When the first user arrives at pick up location for ride sharing offer C, the scheduling module 170 may transmit a message to the first user stating, "Your car sharing trip+ride share offer C is underway," and a message to the second user stating, "Your ride sharing trip with (first user) is underway." In general, the telematics system 104 of the vehicle 102 may include GPS information from the GPS unit 118, which the server 108 may combine with GPS information from the respective GPS units 118 installed in the mobile devices of the first user and the second user to determine the status of car sharing and ride sharing trips in real-time.

Any of the users associated with ride share offers along the route 208 or the route 210 may request transportation to an intermediate destination. For example, the user associated with the ride share offer C may have a destination of the ride share offer D, whereas the user associated with the ride share offer D has a destination in common with the first user, namely that of the destination 206-D. Furthermore, although only two routes are depicted in FIG. 2, and a limited number of car sharing offers, it is envisioned that many more routes and car sharing offers may be displayed, in some embodiments.

It should be appreciated that in some embodiments, the motivation of the users associated with the ride sharing offers (e.g., ride sharing offer C) may intend to travel to the destination of the first user for a similar/common purpose (e.g., traveling to the destination 206-D to watch a baseball game). On the other hand, the motivation of the ride sharing user may merely be to obtain door-to-door delivery of a vehicle of a CSP that may be used for an entirely different purpose. Both the CSP customer operating a vehicle and customers seeking first mile/last mile transportation, and/or rides to a common destination, may be provided with an application for accessing the route matching environment.

Multi-User Example

As noted, one benefit of the present application is to keep vehicles in the CSP fleet moving at all times, to avoid downtime and associated efficiency loss. Multiple users may drive a vehicle in the fleet in succession, with the computing environment 100 receiving a respective origin and destination of each user, and generating car sharing offers. For example, a first user may be using a vehicle in a car sharing capacity, to travel from a first destination to a second destination. The first user may have a device such as the device 202. One or more passengers generally along the route of the first user may use an application to submit an indication of interest in receiving a car sharing ride from the first user, and/or in using the vehicle as a car sharing user. The server 108 may receive the locations of the first user and the one or more interested users. For example, the server 108 may receive a real-time location or a periodic update from the respective devices of the first user and the one or more interested users. The server 108 may analyze the locations, and in some embodiments, the velocity of the first user, to determine whether the first user is likely to accept an offer to act in a ride sharing capacity with respect to any of the one or more interested users. As discussed herein, the server 108 may use machine learning to rank the one or more interested users. The server 108 may then generate one or more ride sharing offer, and may transmit the one or more ride sharing offer to the first user.

For example, a second user may be located two miles from the destination of the first user, in the direction to which the first user is traveling (or will travel, if the first user has not yet departed the origin of the first user). A third user may be located at the origin of the first user but may have a destination forty miles due northwest of the destination of the first user. A fourth user may be located several miles north of the first user's destination and may be destined for a location ten miles south of the first user's destination. In this example, the server 108 may determine that the shared destination of the first user and the second user, and the fact that the second user's origin is generally along the path of the first user's travel, indicates that the first user is likely to act in a ride sharing capacity toward the second user. Therefore, the device of the first user may display a notification offering a 10% car sharing discount to pick up the second user, and also notifying the first user that the second user will assume control of the vehicle at the conclusion of the first user's trip. The device of the first user may not display options with respect to the other users because their trips do not match that of the first user.

The first user may accept the discount and pick up the second user, completing the trip of the first user at the destination of the first user and the second user. At this time, the first user may exit the vehicle, with the second user remaining in the vehicle. Based on the second user continuing to operate the vehicle, as reflected by telematics data received/analyzed in the server 108, the server 108 may generate an offer and transmit the offer to the second user. The offer may notify the second user that the fourth user wants to assume control of the vehicle for car sharing purposes, and may include an incentive for picking up the fourth user (e.g., a 5% discount) before the second user reaches his/her destination. In this example, the second user may accept the offer via the device, as discussed herein, and pick up the fourth user. Once the second user completes his/her trip, and exits the vehicle, the fourth user's trip may begin, with the fourth user taking over control of the vehicle and driving the vehicle to the destination of the fourth user. The server 108 may analyze the route of the fourth user, and the other potential car sharing passengers, to offer the fourth user an incentive to pick up someone with a similar destination, who may need the vehicle for another purpose.

To facilitate the near-continuous operation of the vehicle as discussed in the foregoing example, the server 108 may include instructions for analyzing the route of each car sharing operator at the beginning of a trip. For example, the server 108 may analyze the route of the car sharing operator when the car sharing operator checks out at a point of sale (e.g., a retail CSP location). In some embodiments, the server 108 may analyze the route of the car sharing operator periodically as the vehicle is operated (e.g., every 10 minutes) or in response to the occurrence of a condition (e.g., when the car sharing operator changes destination in a GPS turn-by-turn application in a mobile device of the car sharing operator). It should be appreciated that the trained machine learning model may be repeatedly evaluated to modify and/or update an offer, to increase/decrease the incentive as the car sharing customer/operator drives the vehicle. A cycle of continuous driving of the vehicle or driving punctuated by short hand-offs from CSP customer to CSP customer may occur, thereby keeping the vehicle always in operation. In the above example, the first user was not required to find a parking spot. The second user was not required to find a car or a parking spot, as he was picked up at his origin. Each user who picked up another user saved money by receiving a discount/incentive and by not having a first mile or last mile problem.

Example User Applications

Figure 3:
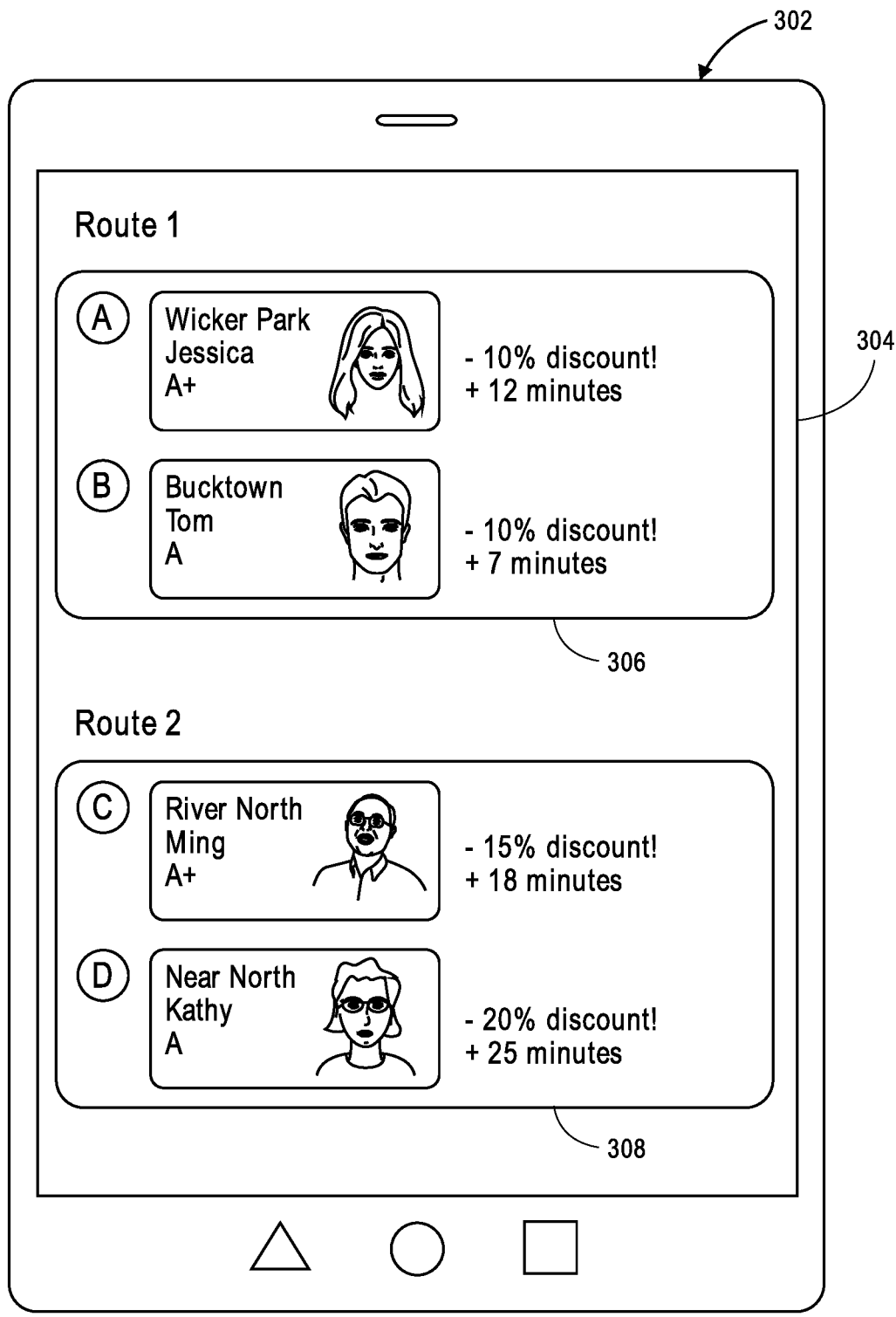
FIG. 3 depicts an example computing environment for implementing alternative route selection for first mile/last mile ride sharing, according to an embodiment.

FIG. 3 depicts an example computing environment 300 for implementing vehicle operator route selection for first mile/last mile ride sharing, according to an embodiment. Environment 300 may include a device 302, which may correspond to the telematics system 104, in some embodiments. In some embodiments, the device 302 may be a mobile computing device of a first user who is a car sharing customer of a CSP. For example, the device 302 may be the device of the first user as discussed with respect to FIG. 2.

The device 302 may include a screen 304 for displaying a plurality of routes. For example, the screen 304 displays a first route 306 and a second route 308. The route 306 corresponds to the route 208 of FIG. 2. The route 308 corresponds to the route 210 of FIG. 2. By viewing the screen 304, the user may view a list of routes, wherein each route includes a list of car sharing ride offers. For example, the route 306 includes two ride sharing offers, each including a rider location, rider name, rider rating, and respective discount and detour in terms of additional time. The routes may be mutually exclusive, and therefore, the device 302 may include instructions such that when the car sharing user selects one of the routes using the input capabilities of the device 302, the other route is made un-selectable. By touching the screen 304, the car sharing user may accept or reject ride sharing offers. For example, the car sharing user may swipe to the right to accept providing a car sharing ride to the ride sharing user Tom. The car sharing user may swipe to the left to reject providing a car sharing ride to the user Jessica. The device 302 may include instructions for transmitting the selections of the car sharing user to remote computing system (e.g., the server 108). The device 302 may include instructions for displaying navigation based on car sharing ride offers accepted by the car sharing user. For example, once the car sharing user accepts the offer to provide a ride to Jessica, the device 302 may display turn-by-turn navigation to the location of Tom (e.g., in the map view of FIG. 2.). As described above, incentives/costs may be generated using respective trained ML models.

Figure 4:
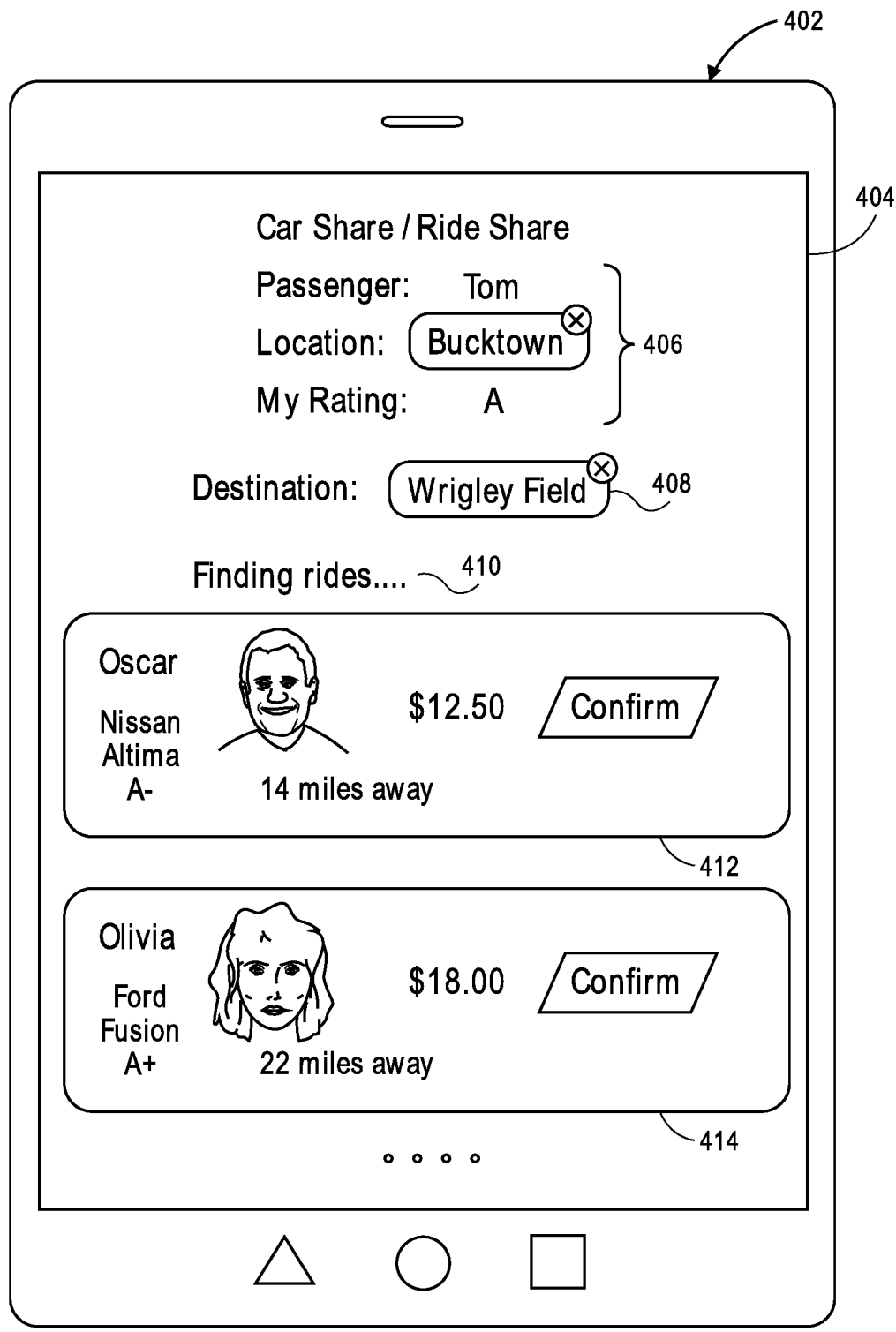
FIG. 4 depicts an example computing environment for implementing selection of a second car sharing user for first mile/last mile ride sharing, according to an embodiment.

FIG. 4 depicts an example computing environment 400 for implementing operator selection for first mile/last mile ride sharing, according to an embodiment. FIG. 4 includes a computing device 402 that may correspond to the telematics system 104, and/or a mobile computing device of a user. The device 402 may include a screen 404 that may be a capacitive touch screen, in some embodiments, like the screen 304 and the screen 204.

To continue the example of FIG. 3, FIG. 4 depicts an interactive user interface that may be displayed to allow the user Tom to select a car sharing user for obtaining first mile/last mile service. The first user from the example given with respect to FIG. 3 could be either Oscar or Olivia, in some embodiments. That is, a given user seeking a first mile/last mile ride sharing offer, such as Tom with respect to FIG. 4, is able to choose from multiple car sharing customers. Specifically, the screen 404 allowing the first mile/last mile ride sharing customer to select a car sharing customer may include a personal information portion 406 including the name of the ride sharing customer and the ride sharing customer's location. The location may be obtained from a location sensor of the device 402 (e.g., from a GPS unit corresponding to the GPS unit 118). The rating of the ride sharing customer may also be displayed. Ratings for ride sharing customers and car sharing customers may be determined using any suitable feedback mechanism, such as by automated algorithms operated by the CSP, and/or crowd-sourced peer-based feedback of ride sharing users and car sharing users of the CSP.

The user seeking a first mile/last mile ride sharing pickup may search for a car sharing user to provide a ride. In some embodiments, the ride sharing user may type a destination into a destination field 408. The device 402 may include instructions for transmitting the origin and destination of the ride sharing user to a remote computing device (e.g., to the route analysis module 168 of the server 108) and for displaying a message 410 to the user while waiting for the remote computing system to analyze the route of the ride sharing user to find matching car sharing users. Once the remote computing system identifies one or more car sharing users whose routes can be integrated with the route of the ride sharing user, the car sharing users may be displayed. For example, FIG. 4 depicts a car sharing user 412 whose route can be integrated with ride sharing user's route. The car sharing user 412 is displayed, including a photograph, name, vehicle type, distance, and rating. A cost to the ride sharing user of accepting a ride sharing ride from the car sharing user 412 is displayed. Other pertinent information may be displayed in some embodiments (e.g., estimated time of arrival of the car sharing user) 412 to the present location of the ride sharing user. FIG. 4 depicts an additional car sharing user 414 analogous to the car sharing user 412.

It should be appreciated that in some embodiments, a car sharing user may operate the device 302 at the same time a ride sharing user operates the device 402 (i.e., simultaneously or nearly simultaneously). Each of the device 302 and the device 402 may transmit respective indications identifying the car sharing user and ride sharing user to a remote computing device (e.g., the server 108). As discussed above, the remote computing device may include instructions for intermediating, or matching, the offer of the car sharing user and the ride sharing user. In some embodiments, multiple ride share pickup offers may be displayed to the car sharing user, and/or multiple car sharing pickup options may be displayed to the ride sharing user. The matching module 172 may use atomic locking operations to avoid race conditions in matching a car sharing user to a ride sharing user, and vice versa. In some embodiments, a car share user may overshoot the car share user's final destination to pick up a ride share user.

Backtracking Example

Figure 5A:
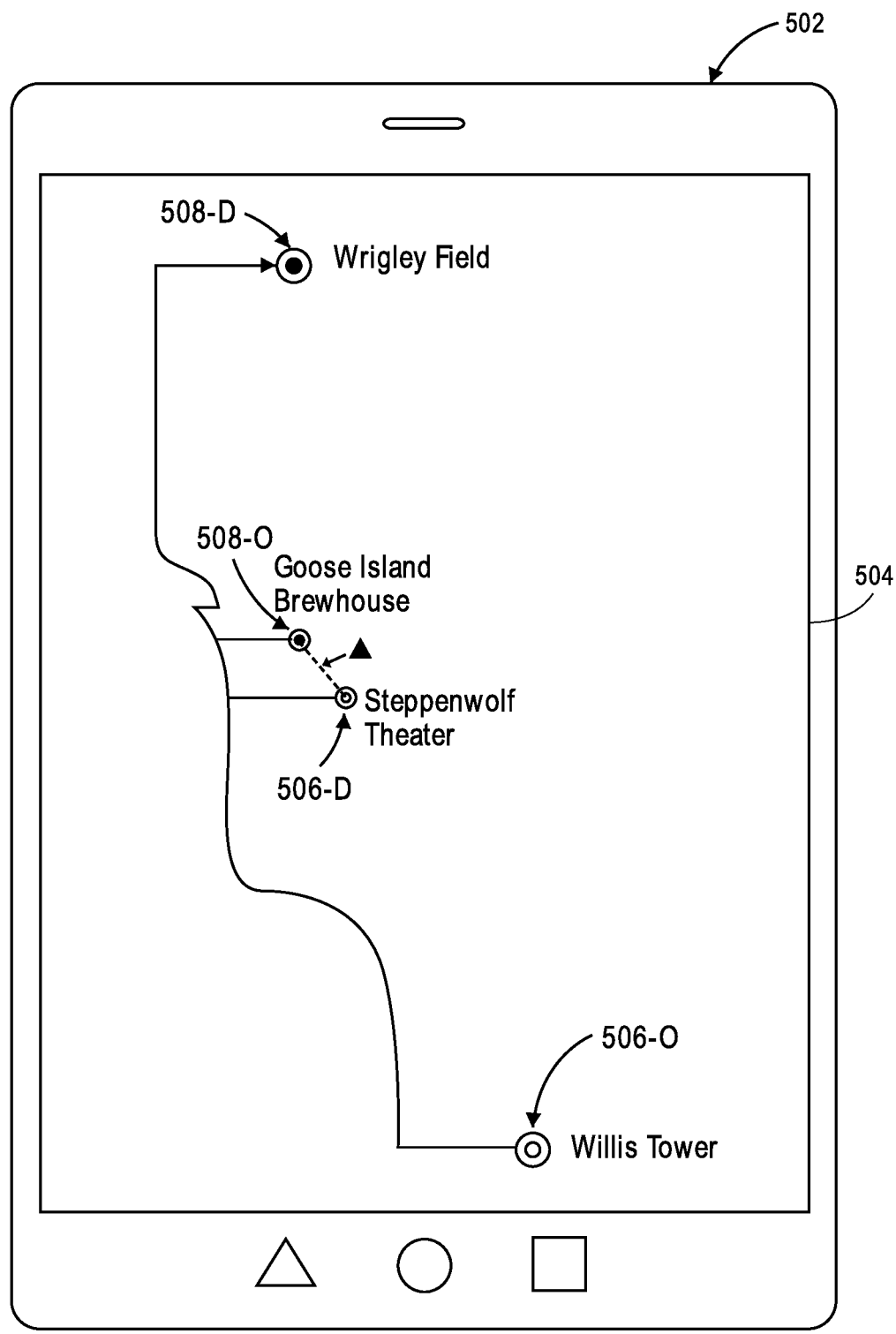
FIG. 5A depicts an example map view user interface for implementing first mile/last mile car sharing with distinct origin locations, according to an embodiment.

FIG. 5A depicts an example computing environment 500 for implementing a backtracking first mile/last mile ride sharing pickup. Environment 500 includes a computing device 502, which may correspond to the telematics system 104 and/or the computing device 402. The computing device 502 includes a screen 504 and includes instructions that when executed cause a map view to be displayed in the screen 504. The map view may include a first user origin 506-O representing a current location of the first user. The map view may include a first user destination 506-D representing a desired destination of the first user. The map view may include a second user origin 508-O representing a current location of the second user. The map view may include a second user destination 508-D representing a desired destination of the second user. The map view may also include a delta ($\Delta$) representing an offset or distance between a destination of the first user and an origin of the second user. The delta is a distance beyond the first user's destination 506-D which the first user must travel to provide a ride share to the second user.

Figure 5B:
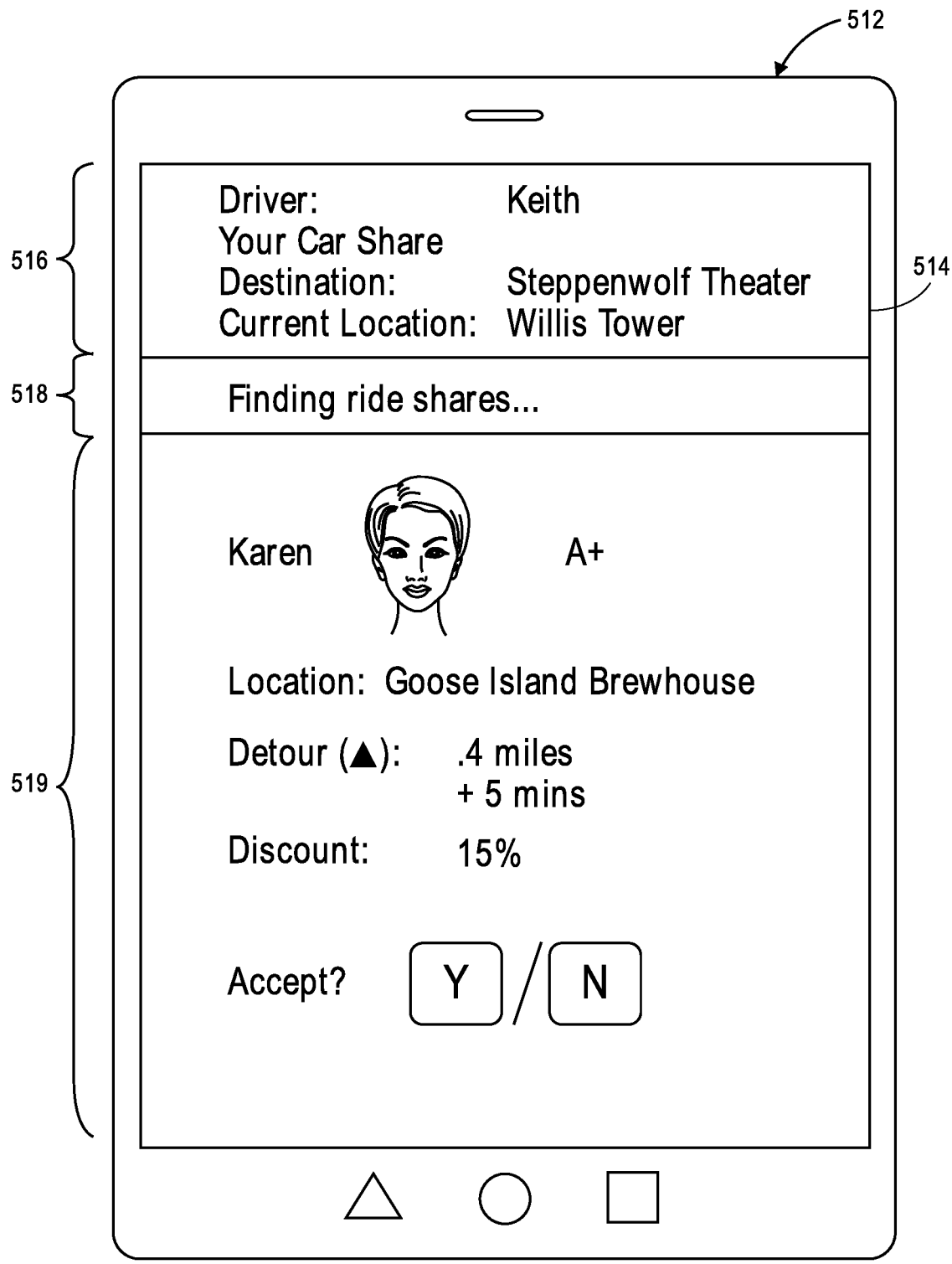
FIG. 5B depicts an example computing environment for implementing a first user selection of a ride sharing passenger pick up, according to an embodiment.

FIG. 5B depicts an example computing environment 510 for allowing a car sharing user to find a ride sharing user. The environment 510 includes a computing device 512 having a screen 514. The computing device 512 may correspond to the telematics system 104, the computing device 502, etc. The computing device 512 may include a screen 514. The screen 514 may include a driver information panel 516, a status panel 518, and a ride share offer panel 520. The driver information panel 516 depicts a driver, Keith, who is a car sharing customer traveling from the Willis Tower to Steppenwolf Theater. Thus, the trip of the car sharing customer depicted in the driver information panel 516 corresponds to that of the trip represented in FIG. 5A by the origin 506-O and the destination 506-D. In the depicted embodiment, the status panel 518 displays a notification to the driver that instructions executing in the device 512 are searching for ride shares. In some embodiments, the ride shares may be found/determined passively, as the car sharing trip progresses to certain event transitions (e.g., in response to the vehicle being driven by the driver coming to a rest). In other embodiments, the screen 514 may display push notifications including ride share offers. In the depicted embodiment of FIG. 5B, the ride share offer panel 519 includes an offer to pick up a rider, Karen, at a location corresponding to the location 508-O of FIG. 5A. The delta between Karen's pickup location 508-O and Keith's destination 506-D is displayed, so that Keith may decide whether to accept the ride share offer. Additionally, a rating of Karen is displayed, and a discount to the car sharing rate is displayed. The device 514 also includes instructions for displaying buttons allowing the driver Keith to accept or reject the ride share offer.

Figure 5C:
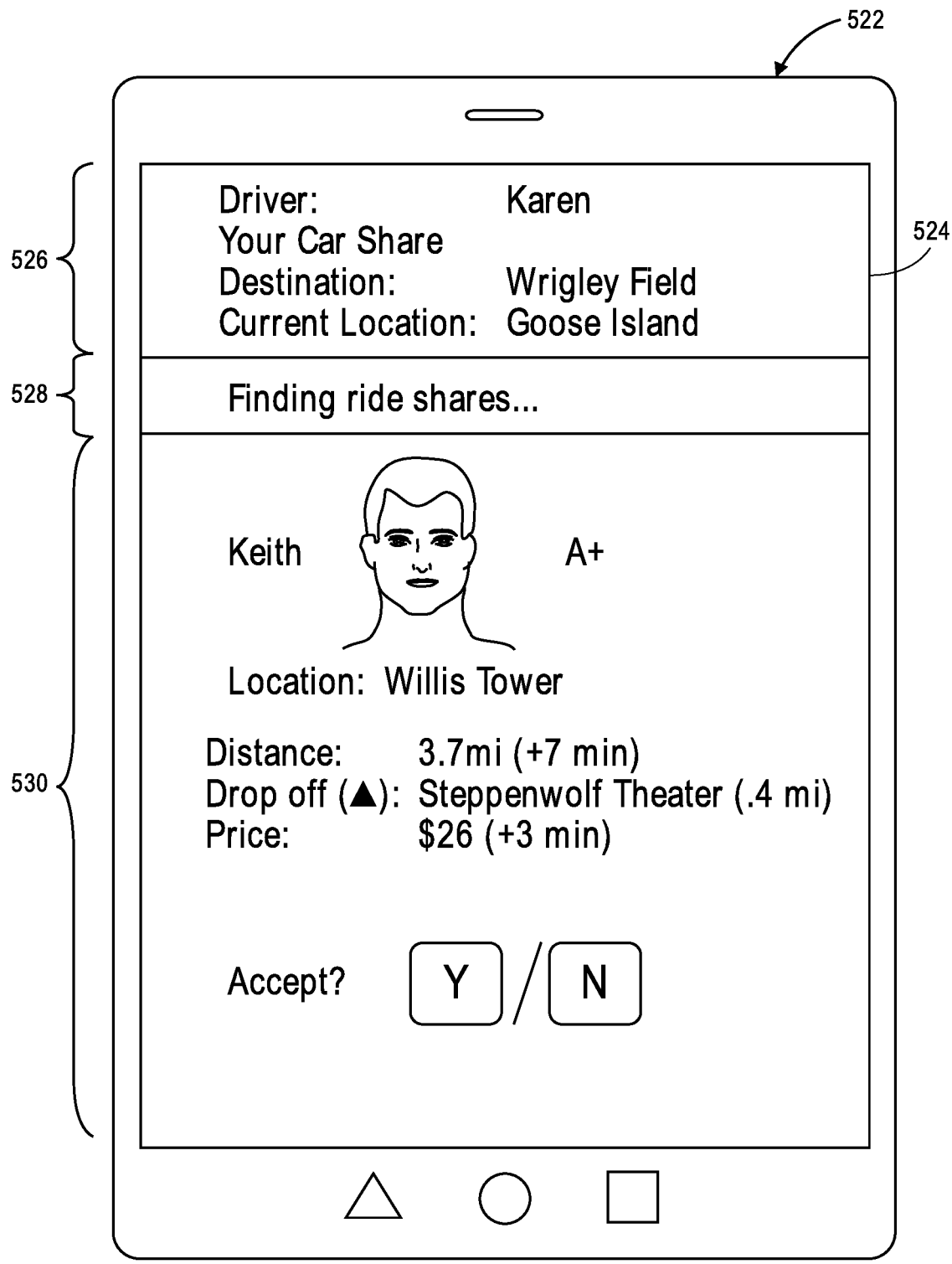
FIG. 5C depicts an example computing environment for implementing a second user selection of a ride sharing vehicle operator, according to an embodiment.

FIG. 5C depicts an example computing environment 520 for allowing a car share customer to find an intermediate ride share. The computing environment 520 may include a computing device 522, which may correspond to the telematics system 104, for example. The computing device 522 may include a screen 524 that may correspond to the screen 324, for example. The screen 524 may be a capacitive touch screen. The screen may display a ride share information portion 526, an application status portion 528, and a car share offer panel 530. The ride share information portion 526 may display information corresponding to the user of the device 522. For example, the ride share information portion 526 may display the name, location, and destination of the user of the device 522. The device 522 may include instructions for automatically determining the current location of the user of the device 522, and instructions for receiving input from the user of the device 522 specifying a destination. The device 522 may include instructions for transmitting the destination and location of the user of the device 522 to a remote computing device, such as the server 108, and for receiving a ride sharing offer. The device 522 may include instructions for displaying status messages in the application status portion 528 and for displaying the offer in the car share offer panel 530.

The car share offer panel 530 may include a profile (e.g., name, avatar, rating, and current location) of a car sharing user who is available to offer a ride to the user of the device 522. The car sharing user may correspond to the driver (i.e., Keith) depicted in FIG. 5B. Similarly, the user of the device 522 may correspond to the rider depicted in the ride share offer panel 519 of FIG. 5B (i.e., Karen). The car share offer panel 530 may include a distance and time representing the additional distance/time the user of the device 522 would need to travel.

In operation, a first user who is a CSP user (e.g., a customer of a CSP in possession of a CSP vehicle) may access an application executing in a first device of the first user (e.g., device 512). The first user may access the first device actively, such as by selecting a first application from an operating system menu of the first device; or passively, such as by receiving a push notification prompting the user to view the application. While the first user is accessing the first application, the first application may receive/retrieve ride share offers. In the depicted example of FIG. 5B, the first user, Keith, receives an offer to provide a ride share to the second user, Karen. The second user may be displayed in the first device in response to a ride share offer request of the second user.

The second user may access a second device, such as the device 522, actively or passively as described above with respect to the first device. For example, the second user may enter a destination into the second device and press a submit button (not depicted). The second device may transmit the second user's desired destination to the server 108, wherein the first user and second user are matched by scheduling module 170 and the matching module 172 as described above. The server 108 may determine a discount to the first user and a cost to the second user, using the trained ML models as described above. Once the server 108 matches the first user and the second user, the server 108 may transmit a respective offer to both the first device and the second device, for display in, respectively, the ride share offer panel 519 and the car share offer panel 530. Once both the first user and the second user have accepted the respective offers, the second display may receive turn-by-turn map and routing instructions in a screen similar to the screen 504. For example, the turn-by-turn map may guide the first user to the location of the second user.

In some embodiments, the first user may drive the vehicle from the location 506-O to the location 508-O, whereupon the first user may pick up the second user (i.e., the second user is a ride share passenger). The first user may then drive the vehicle to the location 506-D, whereupon the first user parks the vehicle and exits the vehicle. The second user may then resume driving the vehicle to the location 508-D, whereupon the second user may park the vehicle in a location (e.g., a parking spot) designated by the CSP. Both the first user and the second user may receive turn-by-turn navigation from a remote computing device during the trip from the location 506-O to location 5068-O, from location 508-O to location 506-D, and from location 506-D to location 508-D.

The present techniques include many benefits. The first user may benefit by receiving a discounted car sharing price. The second user may benefit by receiving a first mile and/or last mile car sharing ride from the first user. As in the example depicted by FIG. 3, a first user may choose one or more second users having an acceptable rating, and discount/detour that is acceptable to the first user. As depicted in FIG. 4, the second user may agree to be picked up by one or more car share users, providing multiple opportunities for the second user to overcome the first mile problem (e.g., door-to-door service). A benefit to the CSP is more runtime for vehicles of the CSP, wherein the vehicles are not sitting idle waiting for a user.

In FIG. 5A, the CSP may not be willing to provide the vehicle to the first user traveling from location 506-O to location 506-D unless the first user agrees to pick up the second user at the location 508-O, and then transfer possession of the vehicle to the second user when the first user and the second user reach the destination 506-D. Insofar as the agreement of the first user to act in a ride sharing capacity with respect to the second user creates an economically viable ride sharing/car sharing trip combination, the embodiment of FIG. 5A solves the last mile problem with respect to the first user, and the first mile problem with respect to the second user. It should be appreciated that the examples discussed herein have been intentionally simplified for purposes of discussion, and that other embodiments and scenarios may exist in practice. For example, additional users, having additional origins/destinations are supported by the present techniques. As noted, other vehicle types are supported (e.g., tractor trailers).

Example Method

Figure 6:
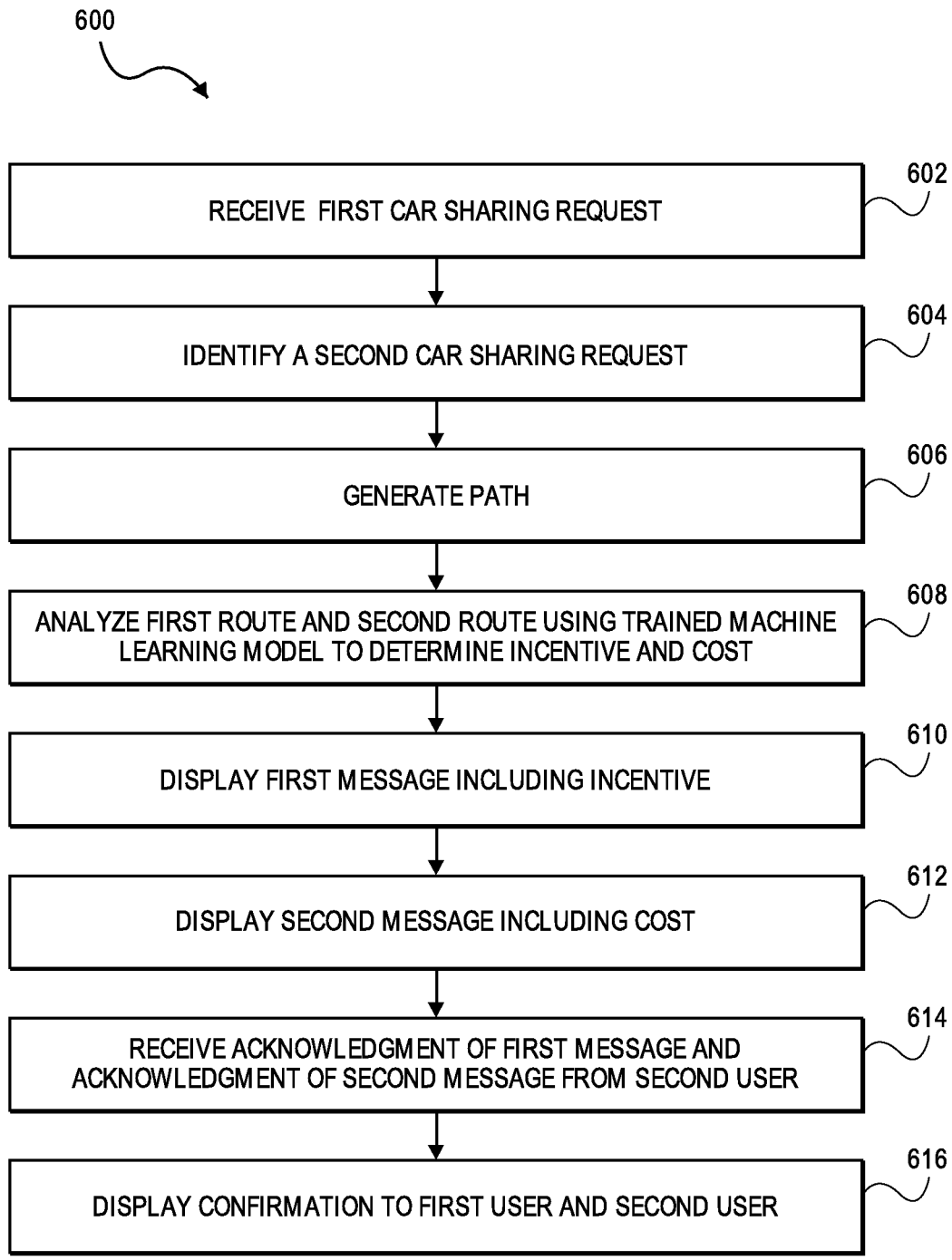
FIG. 6 depicts an example method for facilitating vehicle transfer in a car sharing environment, according to one embodiment and scenario.

FIG. 6 depicts an example method 600 of facilitating a first mile/last mile transfer of a vehicle. The method 600 may include receiving a first car sharing request of a first user including a first route having a first current location and a first destination (block 602). For example, the first car sharing request may be an electronic message submitted by a user device (e.g., the device 404, the device 512, the device 522, etc.). The user device may include instructions for submitting the message in response to an event captured by the user device. For example, the display 114 may capture a touch event in a capacitive screen of the telematics system 104 corresponding to a destination on a map, and/or a textual input corresponding to the name of a destination. The first user may be a car sharing user or a ride sharing user. For example, the first user may be a user seeking a vehicle (e.g., the vehicle 102) to use as a customer of a CSP. The first route may include a path (i.e., a set of geographic points representing locations traversed by the first user). The first route may include a current location representing an origin of the user (e.g., the first user's starting point) or current location along the path of the first route (e.g., a waypoint, a GPS location, a distance traveled, a landmark, etc.). The first route may include a first destination, representing a location the first user is traveling to. The first destination may be represented as a waypoint, a GPS location, a distance traveled, a landmark, etc.

The method 600 may include identifying a second car sharing request including a second route having a second current location and a second destination (block 604). The second car sharing request may be similar to the first car sharing request, including an electronic message submitted by a respective device of the second user. The first car sharing request and second car sharing request may be submitted in any order, or simultaneously. The second car sharing request may include a second request for a vehicle to use as a customer of a CSP. The second route may include a second current location representing a location of the second user, and a second destination representing a location the second user is traveling to.

Identifying the second car sharing request may include analyzing a set of requests queued in a server (e.g., the server 108). For example, the processor 160 may execute instructions in the scheduling module 170 and/or the matching module 172, as described above, to find two routes that are combinable according to a respective time, a respective distance, and/or a respective geographic proximity. For example, given a first user A and a second user B, the scheduling module 170 may determine that the user A and B are a ten minute drive from each other. The matching module 172 may determine A's origin ($A_o$), A's destination ($A_d$), B's origin ($B_o$), and B's destination ($B_d$). The matching module may determine a combined route of $A_o$, $B_o$, $A_d$, $B_d$. In this case, A receives the benefit of a last mile drop-off, and B receives the benefit of a first mile pickup, as A picks B up at B's origin. In other words, A is caused to provide what is effectively a ride sharing service to B, from the time A picks B up at $B_o$ until A and B reach $A_d$.

The scheduling module 170 may receive realtime telematics from the telematics processing module 174 allowing the scheduling module 170 to determine B's position and time/distance to A. As discussed above, the server 108 may receive/retrieve information from the traffic module 176 to more accurately adjudge such times/distances. It should be appreciated that the examples discussed herein are intentionally simplified for purposes of discussion and that additional scenarios are envisioned, such as those in which the method 600 is performed in the environment 100 to support requests and/or routes of two or more users. It should also be appreciated that the first destination and the second destination may be the same, or different.

The method 600 may include generating a path, wherein the path includes the first current location, the second current location, the first destination, and the second destination (block 606). For example, the path may be represented as an array of geographic points. The path may include a Euclidean distance or other suitable geographic distance metric. The method 600 may include determining whether the second current location is along the path of the first current location to the first destination by, for example, using a graphing search algorithm and/or API (e.g., a mapping API such as OpenStreetMap). In some embodiments, searching for the second current location along the path from the first current location to the first destination may include determining whether the second current location is within a pre-determined proximity of the path (e.g., within five miles of the path).

The method 600 may include analyzing the first route and the second route using a trained ML model to determine an incentive and a cost (block 608). Continuing the above example, the combined route may be selected based on A's destination being along B's path, or within a number of miles or minutes of points along B's path (e.g., not causing B to undergo more than a 10 mile and/or 15-minute detour). A trained ML model may be accessed to determine a maximum time/distance, beyond which A is unlikely to accept an offer to pick up B. Such a model may be trained using historical data, wherein the historical data includes distances a respective first user was from a respective second user when the first user accepted an offer to pick up the second rider. A trained ML model may be used as discussed above to determine a minimum incentive that the user A is likely to accept to act in a ride sharing capacity with respect to user B. A trained ML model may be used as discussed above to determine a maximum price that the user B is willing to pay to accept a ride share from the user A. In some cases, the maximum price for the user B may be based on profit to the CSP, fuel prices, or other practical considerations.

The method 600 may include displaying a first message to the first user including the determined incentive (block 610). For example, the incentive may be displayed to the user as depicted in FIG. 3. As noted, the method 600 may support more than two car sharing requests, such that the user A can pick from multiple routes (e.g., the route 306 and the route 308) that include multiple offers to pick up ride sharing users, wherein the ride sharing users are traveling to a destination along the user A's path. As depicted in FIG. 4, the second message to the user B may be displayed in a mobile computing device, wherein the user B may select from multiple car sharing users willing to pick up the user B while the car sharing users are traveling to their respective destinations.

The method 600 may include displaying the second message including a cost to the second user (block 612). Continuing the example, the method 600 may display the first message to the first user and the second message to the second user as depicted respectively in FIG. 5B and FIG. 5C. In such embodiments, the first user and the second user may respectively interact with the devices depicted in FIGS. 5B and 5C to cause an acceptance acknowledgement to be received in the ride share offer panel 519 car share offer panel 530. As discussed above, the respective devices may cause the acknowledgement to be transmitted to a remote computing device (e.g., the server 108) or processed in a client device (e.g., the telematics system 104).

The method 600 may include receiving the transmitted acknowledgement(s) in a computing device (block 614). For example, the server 108 may receive the acknowledgement of the first user, and record the fact of the first user's acknowledgment of the first message in an electronic database (e.g., the database 180). The server 108 may previously (or later) receive the acknowledgement of the second user, and record the fact of the second user's acknowledgement of the second message in the database. The matching module 172 may periodically query the database 180 for combined routes having two respectively acknowledged messages. In an embodiment, once the matching module 172 identifies a pair of acknowledged messages corresponding to a combined route, the matching module 172 may transmit a confirmation message to the device of the first user and the device of the second user (block 616).

Example Mobile Application

In general, the techniques herein (e.g., the method 600) may be implemented using a combination of one or more clients and/or one or more server devices. For example, depending on the hardware and software implementation chosen by an implementer, the method 600 may be entirely implemented using a single computing device (e.g., the telematics system 104). Increasingly, software developers are using user interface frameworks to build applications that allow application data, structure, state, behavior, and styling to be independently designed and managed. React.js and Angular are two popular application platforms for creating mobile applications, for example.

The user interface framework may be entirely contained within a module of the telematics system 104 of FIG. 1. For example, the user interface framework may be included in a mobile application (e.g., Android or iPhone application) downloadable from an application store which is stored in the memory 112 and is executed by the processor 110. In some embodiments, the user interface framework may generate a mobile application that is deployed in the telematics system 104. The user interface framework may associate the structure of one or more user interfaces with respective behavior, styling, state, and data bindings.

The user interface framework may define a structure, or a "shell" of one or more user interfaces. For example, the user interface framework may define separate structure for the user interfaces displayed in the respective screens (e.g., screen 404 and screen 514, for example).

In a first example of the user interface framework defining user interface structure, the screen 504 of FIG. 5A may be implemented using the user interface framework. The structure of the screen 504 may include the map view and origins and destination points comprising FIG. 2, lacking the labels, map data, and routes depicted in FIG. 5A.

In a second example of the user interface framework defining user interface structure, the screen 514 of FIG. 5B may be implemented using the user interface framework to have its own structure that differs from the structure of the screen 504, such as a container for the driver information panel 516, a status panel 518, and the ride share offer panel 519. For example, the screen 514 may be denoted in terms of relative vertical regions corresponding to a respective 20%, 5% and 75% of the screen 514. In other embodiments, the vertical regions/divisions may be denoted in terms of absolute values (e.g., pixels, points, ems, etc.). The vertical regions may be associated with respective styling, state, and behavior that are independently configurable via the user interface framework.

As noted, the structure of the respective user interfaces defined by the user interface framework may include a series of heterogeneous components that are simple or complex structures (e.g., buttons, notification overlays, typographical structures, mapping elements, a row of components, a column of components, etc.). These components may be nested. The user interface framework may include data bindings, wherein the user interface framework automatically inserts data into the individual components included in the structure of a user interface. The inserted data may be received/retrieved from a local or remote source (e.g., the server 108) and may be added to the existing structure of a user interface. The mobile application may include instructions for receiving the trip data at particular times, and/or in response to the presence of certain conditions. For example, data may be received in real-time, periodically, once when the mobile application is first accessed by the user, etc. In other embodiments, the user interface framework may update the value of regions (e.g., the status panel 518) in response to a user action (e.g., a touch input to the display 114) or a vehicle-based condition (e.g., the telematics processing module detecting a location of the vehicle 102) or the receipt of information by a component (e.g., the receipt of a car sharing request by the telematics system 104 or the server 108).

Components may include an identifier that allows them to be bound, styled, and unambiguously referenced by the user interface framework. For example, a simple example of a data binding is the car sharing user name "Olivia" of the car sharing user 414 of FIG. 4. That name may be associated with an id="car-sharing-users[1].name". A corresponding data element in a data structure bound to the user interface of the screen 204 may include a data element labeled "Olivia" of type string. The user interface framework may include instructions for binding the data element "Olivia" to the text area, such that whenever data with the label "car-sharing-users[1].name" is received, the value of the text area depicting the second (i.e., 1th) car sharing user name name is always updated. Data bindings may have types (e.g., arrays), and components may be templated so that the value of data received may be interpolated. The user interface framework may bind different types (e.g., strings, integers, etc.) to graphical representations, so that raw numeric data may be displayed as rich graphics (e.g., maps). Similarly, the data binding may include instructions for modifying the display of particular items. The data binding may include instructions for looping through the list data via a programming loop (e.g., a while loop, for loop, etc.) and inserting data at an appropriate position within the structure of the screen 404, for example, and for formatting the data in a standard display format.

The user interface framework may include aspects of behavior information and state information as well. For example, the behavior information may include computer instructions that define, for example, which actions to take in response to a key press of a user transmitted to the application by a device such as the device 124. The state may define aspects of the user interface implemented by the user interface framework that may change over time, such as which (if any) of the car sharing user 412 or the car sharing user 414 is selected, which user screen is currently being displayed (e.g., the screen 204 or the screen 304), which route the user clicked on (e.g., route 306 or route 308), etc. Although state and behavior are separately defined, they may interact. For example, the behavior implemented in response to a key press may depend on which screen is currently displayed.

In an embodiment, the method 600 may be performed by a plurality of mobile applications that respectively include, or are generated by, the above-described user interface framework. For example, at block 610, the first message including the incentive may be received by a first mobile application from a remote computing device (e.g., the server 108 of FIG. 1). In parallel, the second message including the cost may be received by a second mobile application from the remote computing device. Displaying a respective confirmation to the first user and to the second user at block 616 may include rendering the corresponding confirmation structure defined by the user interface framework by, for example, evaluating a data binding, wherein a confirmation message is inserted into the structure of the screen 514 and/or the screen 524, and applying styling to the screen. Rendering the screen may include calling a render function of the user interface framework which outputs complete or partial HTML/JavaScript/CSS files to generate the mobile application. Receiving a car sharing request at block 602 may include receiving a user selection after the mobile application is fully rendered, and may include a click, key press, touch selection, etc. as discussed above. Receiving the user selection may include executing additional behavior instructions that may, for example, retrieve/receive additional information corresponding to the user selection and display that additional information.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer implemented method of facilitating a first-mile/last-mile transfer of a vehicle, the method comprising:
   receiving, via an electronic device of a first user, a first car sharing request of the first user including a first route having a first current location and a first destination,
   identifying a second car sharing request of a second user including a second route having a second current location and a second destination,
   generating a path including the first current location, the second current location, the first destination, and the second destination,
   analyzing the first route using a first trained machine learning model and the second route using a second trained machine learning model to determine, respectively, an incentive to the first user and a cost to the second user,
      wherein the first trained machine learning model is trained using at least one of a historical data set of ride sharing data, wherein the ride sharing data indicates a price that was paid, a distance traveled, a time of day, a time to arrival, a traffic congestion factor, or profile information about the vehicle operator, and
      wherein the second trained machine learning model is trained using at least one of a detour in time, a delay in miles, a time of day, a traffic congestion factor, or profile information about the ride share passenger,
   causing a first message including the incentive to be displayed to the first user via the electronic device of the first user,
   causing a second message including the cost to be displayed to the second user via an electronic device of the second user,
   receiving an acknowledgement of the first message from the first user and an acknowledgement of the second message from the second user; and
   causing a respective confirmation to be displayed to the first user and to the second user.

2. The computer implemented method of claim 1, further comprising:
   receiving telematics information from the vehicle, and
   based on the telematics information, one or both of (i) providing the incentive to the first user, and (ii) collecting the cost from the second user.

3. The computer-implemented method of claim 1, wherein the route between the first current location and the second current location is a first mile route.

4. The computer-implemented method of claim 1, wherein the route between the first destination and the second destination is a last mile route.

5. The computer-implemented method of claim 1, wherein identifying a second car sharing request having a second current location and a second destination includes identifying combinable routes.

6. The computer-implemented method of claim 1, wherein generating the path including the first current location, the second current location, and the second destination includes minimizing a distance between the first current location, the second current location, and/or the second destination using a graph theoretic algorithm.

7. The computer-implemented method of claim 1, wherein generating a path including the first current location, the second current location, the first destination, and the second destination includes determining whether the second current location is along the path of the first current location to the first destination.

8. A computing system comprising:
one or more processors; and
one or more memories storing instructions that, when executed by the one or more processors, cause the computing system to:
receive, in a remote computing system, a first car sharing request of a first user including a first route having a first current location and a first destination, the request received via an electronic device of the first user,
identify, in a remote computing system, a second car sharing request of a second user including a second route having a second current location and a second destination,
generate, via the one or more processors, a path including the first current location, the second current location, the first destination, and the second destination,
analyze the first route using a first trained machine learning model and the second route using a second trained machine learning model to determine, respectively, an incentive to the first user and a cost to the second user,
wherein the first trained machine learning model is trained using at least one of a historical data set of ride sharing data, wherein the ride sharing data indicates a price that was paid, a distance traveled, a time of day, a time to arrival, a traffic congestion factor, or profile information about the vehicle operator, and
wherein the second trained machine learning model is trained using at least one of a detour in time, a delay in miles, a time of day, a traffic congestion factor, or profile information about the ride share passenger,
cause a first message including the incentive to be displayed to the first user via the electronic device of the first user,
cause a second message including the cost to be displayed to the second user via an electronic device of the second user,
receive an acknowledgement of the first message from the first user and an acknowledgement of the second message from the second user; and
cause a respective confirmation to be displayed to the first user and to the second user.

9. The computing system of claim 8, the one or more memories storing further instructions that, when executed by the one or more processors, cause the computing system to:
receive telematics information from the vehicle, and
based on the telematics information, one or both of (i) provide the incentive to the first user, and (ii) collect the cost from the second user.

10. The computing system of claim 8, wherein the route between the first current location and the second current location is a first mile route.

11. The computing system of claim 8, wherein the route between the first destination and the second destination is a last mile route.

12. The computing system of claim 8, the one or more memories storing further instructions that, when executed by the one or more processors, cause the computing system to:
identify a second car sharing request having a second current location and a second destination includes identifying combinable routes.

13. The computing system of claim 8, the one or more memories storing further instructions that, when executed by the one or more processors, cause the computing system to:
minimize a distance between the first current location, the second current location, and/or the second destination using a graph theoretic algorithm.

14. The computing system of claim 8, the one or more memories storing further instructions that, when executed by the one or more processors, cause the computing system to:
determine whether the second current location is along the path of the first current location to the first destination.

15. A non-transitory computer readable medium containing program instructions that when executed, cause a computer system to:
receive, in a remote computing system, a first car sharing request of a first user including a first route having a first current location and a first destination, the request received via an electronic device of the first user,
identify, in a remote computing system, a second car sharing request of a second user including a second route having a second current location and a second destination,
generate, via the one or more processors, a path including the first current location, the second current location, the first destination, and the second destination,
analyze the first route using a first trained machine learning model and the second route using a second trained machine learning model to determine, respectively, an incentive to the first user and a cost to the second user,
wherein the first trained machine learning model is trained using at least one of a historical data set of ride sharing data, wherein the ride sharing data indicates a price that was paid, a distance traveled, a time of day, a time to arrival, a traffic congestion factor, or profile information about the vehicle operator, and
wherein the second trained machine learning model is trained using at least one of a detour in time, a delay in miles, a time of day, a traffic congestion factor, or profile information about the ride share passenger,
cause a first message including the incentive to be displayed to the first user via the electronic device of the first user,
cause a second message including the cost to be displayed to the second user via an electronic device of the second user,
receive an acknowledgement of the first message from the first user and an acknowledgement of the second message from the second user; and
cause a respective confirmation to be displayed to the first user and to the second user.

16. The non-transitory computer readable medium of claim 15 containing further program instructions that when executed, cause a computer system to:
receive telematics information from the vehicle, and
based on the telematics information, one or both of (i) provide the incentive to the first user, and (ii) collect the cost from the second user.

17. The non-transitory computer readable medium of claim 15 containing further program instructions that when executed, cause a computer system to:
identify a second car sharing request having a second current location and a second destination includes identifying combinable routes.

18. The non-transitory computer readable medium of claim 15 containing further program instructions that when executed, cause a computer system to:
- minimize a distance between the first current location, the second current location, and/or the second destination using a graph theoretic algorithm.

19. The non-transitory computer readable medium of claim 15 containing further program instructions that when executed, cause a computer system to:
- determine whether the second current location is along the path of the first current location to the first destination.

20. The non-transitory computer readable medium of claim 15 containing further program instructions that when executed, cause a computer system to:
- compare a dollar value of the first car sharing request to the dollar value of the second car sharing request to determine a profit.

* * * * *